US 6,700,859 B2

(12) United States Patent
Oono et al.

(10) Patent No.: US 6,700,859 B2
(45) Date of Patent: Mar. 2, 2004

(54) INFORMATION RECORDING/REPRODUCING APPARATUS WITH DETAILS OF THE PICKUP SUPPORT UNIT

(75) Inventors: Kenichi Oono, Saitama (JP); Keiichi Takagi, Saitama (JP)

(73) Assignee: Pioneer Corporation, Tokyo (JP)

( * ) Notice: Subject to any disclaimer, the term of this patent is extended or adjusted under 35 U.S.C. 154(b) by 138 days.

(21) Appl. No.: 09/964,452

(22) Filed: Sep. 28, 2001

(65) Prior Publication Data

US 2002/0039345 A1 Apr. 4, 2002

(30) Foreign Application Priority Data

Oct. 2, 2000 (JP) ................................ P2000-302058

(51) Int. Cl.[7] .............................................. G11B 7/00
(52) U.S. Cl. ................................. 369/223; 360/267.4
(58) Field of Search ................................ 369/223, 219, 369/266.2; 360/266.6, 267.6, 267.3, 267.4

(56) References Cited

U.S. PATENT DOCUMENTS

| 5,191,575 A | * | 3/1993 | Kido ............................ 369/223 |
| 5,303,223 A | * | 4/1994 | Sakaguchi et al. ........... 369/215 |
| 5,689,483 A | * | 11/1997 | Ikeda ........................... 369/228 |
| 5,754,022 A | * | 5/1998 | Uehara et al. ............... 318/474 |
| 5,889,638 A | * | 3/1999 | Kabasawa et al. ......... 360/261.3 |
| 6,249,495 B1 | * | 6/2001 | Okada et al. ............. 369/44.28 |
| 6,317,287 B1 | * | 11/2001 | Yano et al. ................. 360/260 |
| 6,445,673 B2 | * | 9/2002 | Park ............................ 369/219 |

FOREIGN PATENT DOCUMENTS

| JP | 01-055468 | 3/1989 |
| JP | 03-241573 | 10/1991 |
| JP | 10-074370 | 3/1998 |
| JP | 2000-187850 | 7/2000 |

* cited by examiner

Primary Examiner—Brian E. Miller
(74) Attorney, Agent, or Firm—Morgan, Lewis & Bockius LLP

(57) ABSTRACT

When the position of the pickup 14 is normalized, a lead screw 29 is rotated by a stepping motor to move the pickup 14 to the outermost circumferential position, whereby a preset counter is preset to the maximum value CTout corresponding to the outermost circumferential position. The counter counts proportionally to the number of driving pulses to be supplied to the stepping motor, the lead screw 29 rotates till the counting value of the counter gets "0", so that the pickup 14 moves near the outermost circumferential track of the optical disk in the lead-in area to make the set up. The shape of the tooth flank of the lead screw 29 and the inclination of the engaging projections 27, 28 are designed such that the step out is caused between the engaging projections 27, 28 and the lead screw 29, when the pickup 14 is moved to the outermost circumferential position. Even if this step out is caused, the engaging projections 27, 28 only engage strongly with the lead screw 29.

6 Claims, 10 Drawing Sheets

INNER CIRCUMFERENTIAL SIDE

OUTER CIRCUMFERENTIAL SIDE

INFORMATION RECORDING/REPRODUCING APPARATUS WITH DETAILS OF THE PICKUP SUPPORT UNIT

BACKGROUND OF THE INVENTION

Field of the Invention

The present invention relates to an information recording/reproducing apparatus for reading or writing the information, employing an optical information recording/reproducing medium such as a CD (Compact Disk) or a DVD (Digital Video Disk or Digital Versatile Disk).

The conventional information recording/reproducing apparatus for reading or writing the information employing the optical information recording/reproducing medium (hereinafter referred to as an "optical disk") such as CD or DVD comprises a pickup 2 having an objective lens 1 for directing a light beam onto the optical disk, and a movement mechanism for moving the pickup 2 in a radial direction of the optical disk, as shown in FIG. 10.

The movement mechanism comprises two guide shafts 3, 4 and a lead screw 5 which are disposed in parallel along the radial direction of the optical disk, and a driving motor 8 for rotating the lead screw 5, in which the pickup 2 is supported in freely slidable manner by the two guide shafts 3, 4, and can be moved by shifting the engaging positions of the projections 6, 7 formed at one end of the pickup 2 with the lead screw 5.

That is, if the lead screw 5 is rotated in a predetermined direction under a driving force of the driving motor 8, the engaged positions of the projections 6, 7 with the tooth flank of the lead screw 5 are displaced toward the outer circumferential side of the optical disk in accordance with the amount of rotation. Also, if the lead screw 5 is rotated in a reverse direction under a driving force of the driving motor 8, the engaging positions of the projections 6, 7 with the tooth flank of the lead screw 5 are displaced toward the inner circumferential side of the optical disk in accordance with the amount of reverse rotation. Along with the displacement of the projections 6, 7, the pickup 2 is moved toward the inner circumferential side or the outer circumferential side, so that the pickup 2 can gain access to the position for reading or writing the information of the optical disk randomly.

Also, a detection switch 9 or 10 for detecting a home position (reference position) of the pickup 2 is provided on one side of the guide shafts 3, 4 in a longitudinal direction (i.e., guide direction). It is common practice that the home position is detected by the detection switch 9 provided on the inner circumferential side of the optical disk.

And the pickup 2 is forcefully moved toward the inner circumferential side to press the detection switch 9, so that a detection signal is output from the detection switch 9. On the basis of this detection signal, the home position of the pickup 2 is detected. Further, if the maximum number of driving pulses to be supplied to the driving motor 8 is predetermined with reference to the home position, the movable range of the pickup 2 can be set up.

Also, when the detection switch 10 is provided on the outer circumferential side of the optical disk, the pickup 2 is moved forcefully toward the outer circumferential side to press the detection switch 10, so that a detection signal is output from the detection switch 10. On the basis of this detection signal, the home position of the pickup 2 is detected. Further, if the maximum number of driving pulses to be supplied to the driving motor 8 is predetermined with reference to the home position, the movable range of the pickup 2 can be set up.

By the way, in the conventional information recording/reproducing apparatus as described above, it is required to have the detection switch 9 (or 10) to detect the home position of the pickup 2, resulting in the problem that the number of parts is increased.

To avoid an increase in the number of parts, instead of the detection switch 9 (or 10), a movement regulation member with simple structure such as a projection may be provided at the home position, whereby the pickup 2 is forcefully pressed and stopped against the movement regulation member by driving the driving motor 8 beyond the movable range, and moved to the home position.

However, with such a constitution, when the pickup 2 is moved to the home position, the lead screw 5 continues to be rotated under a driving force of the driving motor 8, although the pickup 2 is brought into direct contact with the movement regulation member and is unmovable. Consequently, the projections 6, 7 get rid of the tooth flank of the lead screw 5, resulting in the problem that there occurs a harsh sound between the projections 6, 7 and the tooth flank.

That is, a phenomenon that the projections 6, 7 get rid of the tooth flank of the lead screw 5 is called a "out of tooth". If this out of tooth occurs, there occurs a harsh large sound such as a "scratching sound" or a "cracking sound", when the projections 6, 7 ride over a crest of the tooth flank of the lead screw 5, and fall in an adjacent trough again, thereby causing the problem that the user may be discomforted.

SUMMARY OF THE INVENTION

The present invention has been achieved to overcome the above-mentioned problems associated with the prior art, and it is an object of the invention to provide an information recording/reproducing apparatus that allows a pickup to gain fast access to an information recording/reproducing medium.

To accomplish the above object, according to the present invention, there is provided an information recording/reproducing apparatus for reading or writing the information by moving a pickup within a predetermined movement range over an information recording/reproducing medium, comprising a lead screw extending in a predetermined direction with respect to the information recording/reproducing medium, driving means for driving the lead screw in rotation, support means for supporting the pickup movably along an extending direction of the lead screw, engaging members for engaging with a tooth flank of the lead screw and integrated with the pickup, regulation means for regulating a movable range of the pickup, and control means for controlling the driving means to drive the lead screw in rotation to bring the pickup into direct contact with the regulation means to normalize a reference position of the pickup in the movable range, wherein the tooth flank of the lead screw engaged by the engaging members is formed like a shape causing a step out when the pickup comes into direct contact with the regulation means.

The regulation means is provided at a position off a loading position of the information recording/reproducing medium.

With the above constitution, the operation for normalizing the reference position of the pickup is performed by bringing the pickup into direct contact with the regulation means. If the pickup is brought into direct contact with the regulation means, a phenomenon of "step out" occurs between the engaging members and the tooth flank of lead screw. If this phenomenon of "step out" occurs, the engaging members engage strongly with the trough of the tooth flank of lead screw and are stopped, and the driving means is stopped under a load exerted. Namely, this phenomenon, unlike the phenomenon in which the engaging members get rid of the tooth flank of lead screw, like "out of tooth", is such that the engaging members engage strongly with the trough of the tooth flank of lead screw and are stopped. Therefore, the occurrence of imitation sound such as "out of tooth" is suppressed, enabling the silence of the apparatus itself.

Also, the control means controls the driving means to rotate the lead screw to bring the pickup into direct contact with the regulation means, and then the driving means to rotate the lead screw by a predetermined amount to move the pickup to a position off the regulation means and to normalize the position after movement as the reference position of the pickup.

With the above constitution, the position near the management information recording area provided on the side of the loading position of the information recording/reproducing medium is set up as the reference position of the pickup, and the pickup can gain access to the management information recording area to make promptly the information reading or writing operation.

Also, the regulation means is provided near the loading position of the information recording/reproducing medium, and the control means controls the driving means to drive the lead screw in rotation to bring the pickup into direct contact with the regulation means at a position near the loading position of the information recording/reproducing medium to normalize the reference position of the pickup in the movable range.

With such a constitution, only by making one normalization, the position near the management information recording area provided on the side of the loading position of the information recording/reproducing medium is set up as the reference position of the pickup, and the pickup can gain access to the management information recording area to make promptly the information reading or writing operation.

DETAILED DESCRIPTION OF THE PREFERRED EMBODIMENTS

The preferred embodiments of an information recording/reproducing apparatus of the present invention will be described below with reference to FIGS. 1 to 9.

Figure 1:
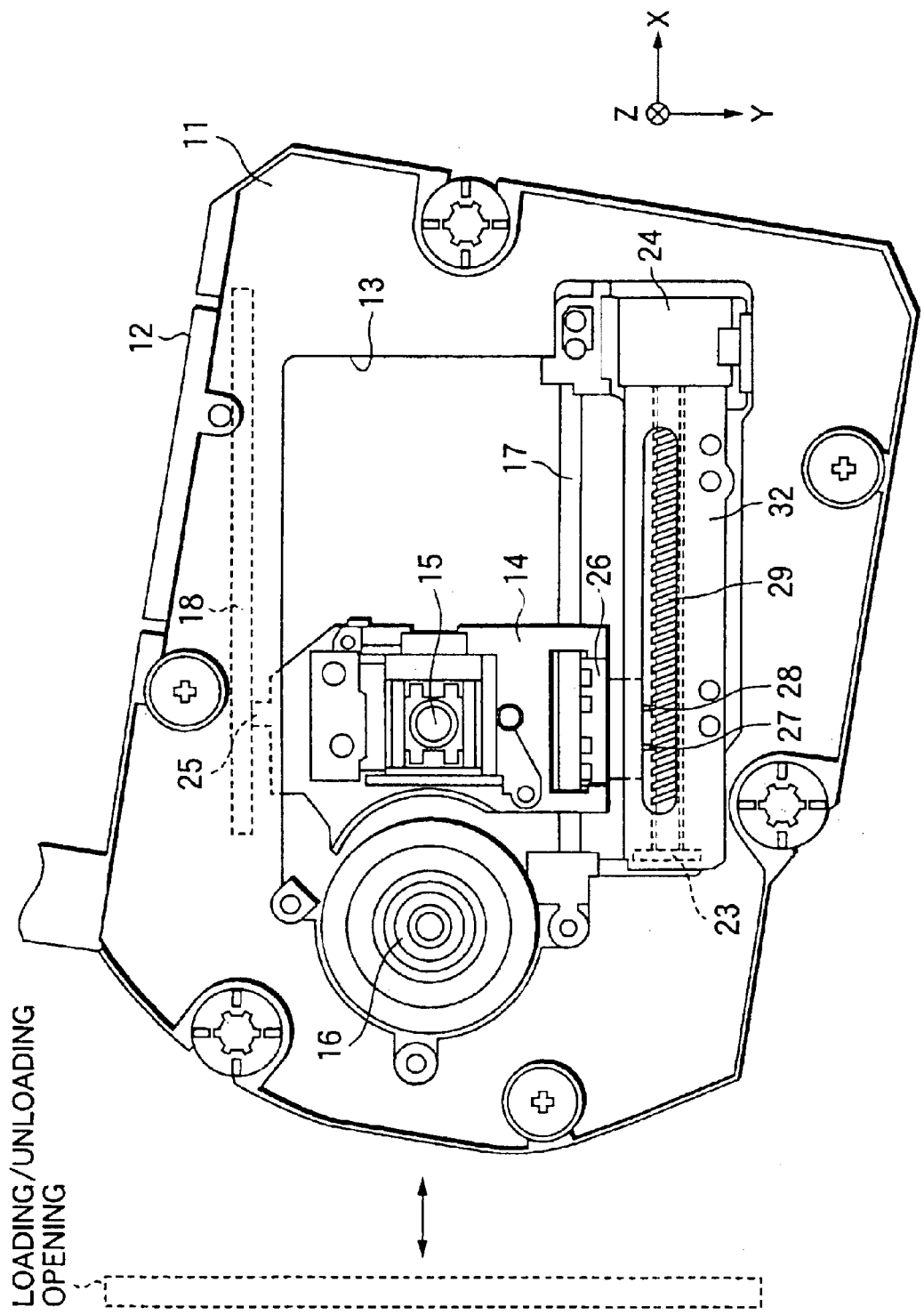
FIG. 1 is a plan view showing the constitution of a transverse mechanism equipped in an information recording/reproducing apparatus according to an embodiment of the invention.
Figure 2:
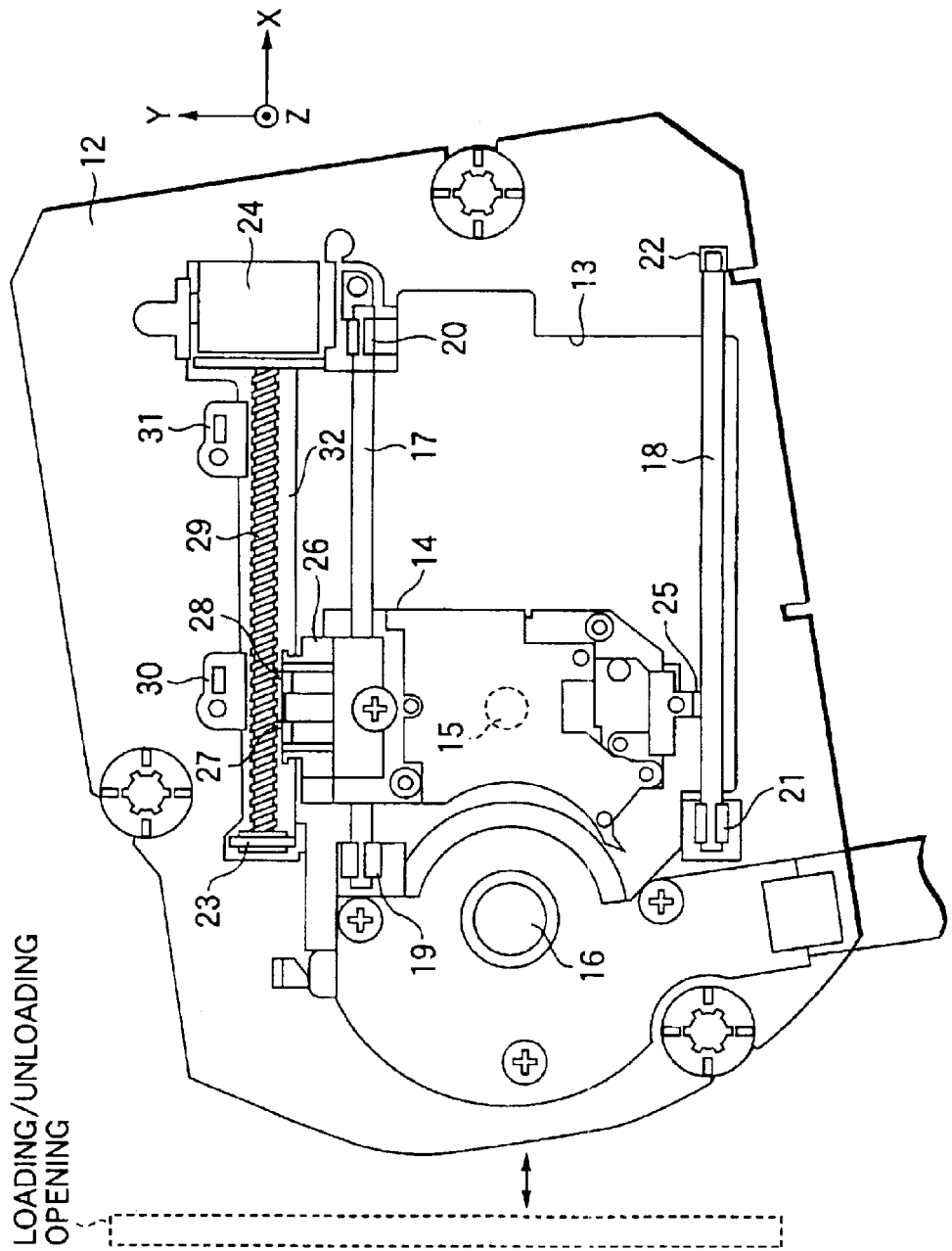
FIG. 2 is a rear view of the traverse mechanism of FIG. 1, as seen from the back face side.

FIG. 1 is a plan view of a traverse mechanism having an optical pickup as seen from the side where an optical disk (not shown) is loaded, and FIG. 2 is a back view of the traverse mechanism as seen from the back face side.

In FIGS. 1 and 2, this traverse mechanism has chassis plates 11, 12 of almost rectangular shape that are integrated oppositely with a predetermined spacing, and a pickup 14 of almost rectangular parallelepiped shape is disposed within the opening portions 13 of almost rectangular shape formed oppositely in the chassis plates 11, 12.

The pickup 14 is provided with an objective lens 15 opposed to the optical disk, whereby a laser beam for reading or writing the information is directed via the objective lens 15 to the optical disk, and a reflected light from the optical disk is made incident and detected, a detected signal being supplied to a signal processing circuit or a microprocessor (not shown) to make the information reproduction or servo control.

At one end of the chassis plates 11, 12, a hub portion 16 is provided to clamp the optical disk and rotate it at a predetermined linear velocity by receiving a driving force of a spindle motor (not shown). The pickup 14 can read or write the information from or into the optical disk clamped to this hub portion 16.

An operation panel of the information recording/reproducing apparatus is provided in front of the hub portion 16. The operation panel has a loading/unloading opening for loading or unloading the optical disk to or from the hub portion 16. Accordingly, the pickup 14 is disposed in rear of the hub portion 16 as seen from the loading/unloading opening.

Further, two guide shafts 17, 18 and a lead screw 29 are provided in parallel on both sides of the opening portion 13 along the hub portion 16. The guide shafts 17, 18 are fixed by support members 19, 20, 21 and 22 protruded with a predetermined interval on a chassis plate 12, as shown in FIG. 2.

The lead screw 29 has its start end supported rotatably by a support member 23 protruded on the chassis plate 12, with its terminal end connected to a drive shaft of a stepping motor 24 as driving means that is secured to the chassis plates 11, 12.

Herein, the pickup 14 is preformed with a through hole (not shown) for passing a guide shaft 17 slidably. The guide shaft 17 is passed through this through hole, with both ends of the guide shaft 17 being fixed by the support members 19, 20, whereby the pickup 14 is supported slidably by the guide shaft 17.

Also, at one end of the pickup 14, a fitting member 25 that can be slidably fit into the circumferential face of a guide shaft 18 is provided. Accordingly, the pickup 14 is slidably supported via the through hole and the fitting member 25 by the guide shafts 17, 18, and can advance or retreat along the longitudinal direction (X direction) of the guide shafts 17, 18.

Also, the pickup 14 is integrated with a driving force transmitting portion 26, called a "joint portion", which is provided with a plurality of engaging projections 27, 28 engaging with the tooth flank of the lead screw 29.

Figure 3:
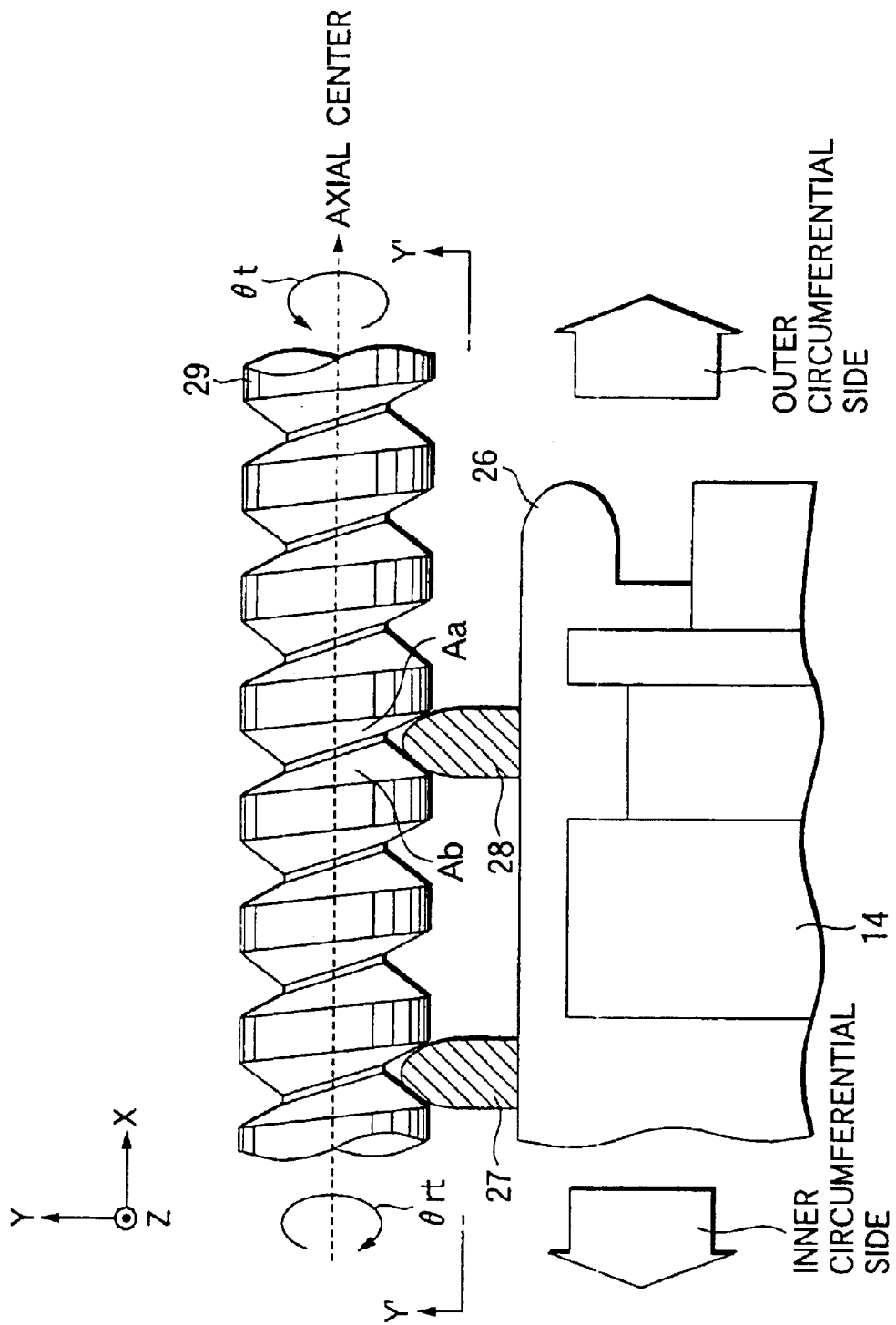
FIG. 3 is a view of the traverse mechanism of FIG. 2, partially enlarged.

That is, as shown in FIG. 3, enlarging a part of FIG. 2, the engaging projections 27, 28 project in a direction almost at right angles (Y direction) relative to the longitudinal direction (X direction) of the lead screw 29, and engage with a trough of the tooth flank of the lead screw 29 under a biasing force exerted from a resilient member (not shown) such as a leaf spring provided at one end of the pickup 14.

Figure 4:
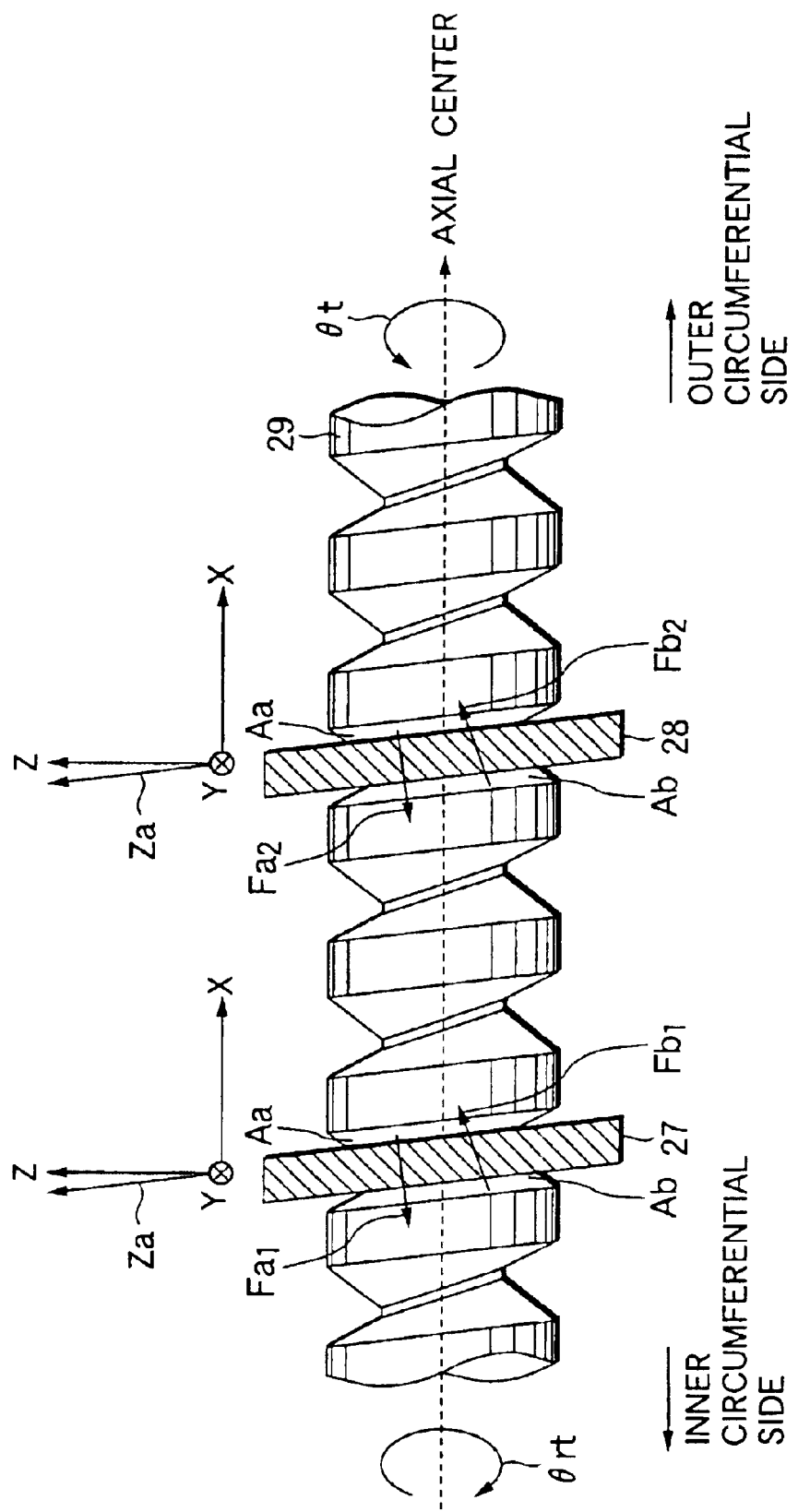
FIG. 4 is a view showing the sectional structure of the transverse mechanism, taken along the virtual line Y'—Y' in FIG. 3.

Further, the engaging projections 27, 28 are inclined in conformance with an inclination direction Za of crest and trough of the lead screw 29, as shown in FIG. 4 (cross sectional view taken along the virtual line Y'—Y' of FIG. 3). Namely, the crest and trough of the lead screw 29, which are formed helically, are inclined toward Za direction by a predetermined angle from the Z direction (i.e., direction orthogonal to the X and Y directions), and the engaging projections 27, 28 are also inclined toward the Za direction to engage the engaging projection 27, 28 into the trough inclined, as shown in FIG. 4.

In FIG. 2, the chassis plate 12 is provided with the Stepper Assembly attaching projections 30, 31 partially in proximity to the tooth flank of the lead screw 29. Further, the chassis plate 11 is provided with a regulation plate 32 in proximity to the entire tooth flank of the lead screw 29, as shown in FIG. 1. By means of these projections 30, 31 and the regulation plate 32, the lead screw 29 is protected from an excessive bending stress.

Herein, if the lead screw 29 is rotated θt in a clockwise direction (i.e., rotational direction as looking at the lead screw 29 from the side of the stepping motor 24) under a driving force of the stepping motor 24, the engaging projections 27, 28 as shown in FIG. 4 are displaced to the radial outside (hereinafter referred to as an "outer circumferential side") of the optical disk under biasing forces Fb1, Fb2 from a left tooth flank Ab at the trough of the lead screw 29, whereby the pickup 14 is also moved along the X direction to the outer circumferential side.

Also, if the lead screw 29 is rotated θrt in a counterclockwise direction (i.e., rotational direction as looking at the lead screw 29 from the side of the stepping motor 24) under a driving force of the stepping motor 24, the engaging projections 27, 28 as shown in FIG. 4 are displaced to the radial inside (hereinafter referred to as an "inner circumferential side") of the optical disk under biasing forces Fa1, Fa2 from a right tooth flank Aa at the trough of the lead screw 29, whereby the pickup 14 is also moved along the X direction to the inner circumferential side.

Thus, the number of driving pulses for setting the rotational amount of the stepping motor 24 and the rotational amount of the lead screw 29, and the amount of displacement for the engaging projections 27, 28 are preset in a predetermined proportional relation, the amount of advancing or retreating movement of the pickup 14 is controlled in accordance with the number of driving pulses.

Figure 5:
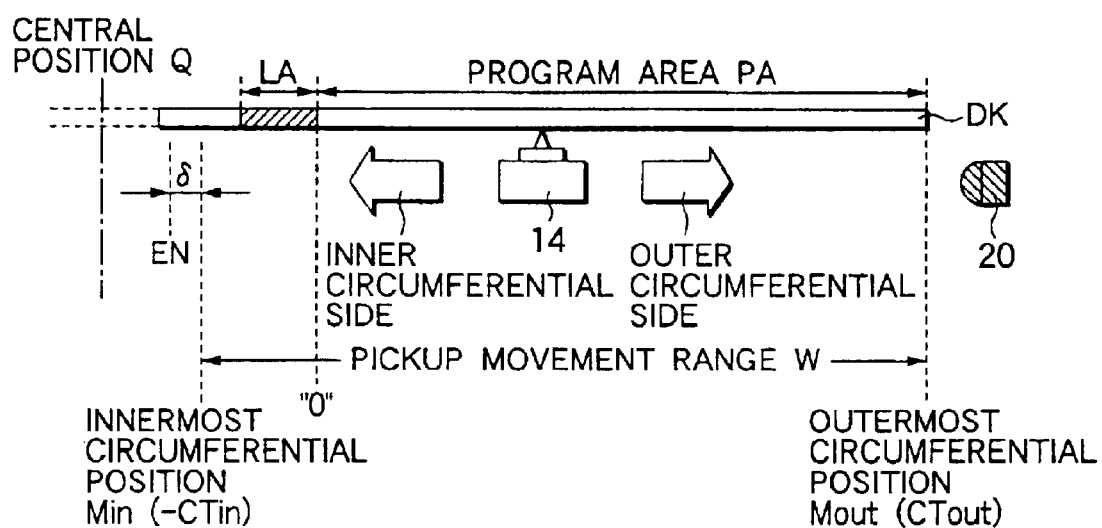
FIG. 5 is a view for explaining the pickup movement range.

Referring to FIG. 5, the movable range of the pickup 14 (hereinafter referred to as a "pickup movement range") with reference to the optical axis center of the objective lens 15 provided in the pickup 14 will be described below.

First of all, if the optical axis center of the objective lens 15 comes to a position EN (referred to as an "absolute regulation position") a predetermined distance away from a central position Q of the optical disk DK clamped by the hub portion 16, the pickup 14 comes into direct contact with a guide shaft support member 19, and is kept from moving to the inner circumferential side. This absolute regulation position EN is defined slightly inside from a lead-in area EA provided in the optical disk DK.

Also, a position Min on the outer circumferential side a predetermined distance δ away from the absolute regulation position EN is defined at the innermost position in the pickup movement range W, and the innermost position Min is located between the lead-in area LA and the absolute regulation position EN. Namely, the number of driving pulses to be supplied to the stepping motor 24 is controlled so that the optical axis center of the objective lens 15 provided in the pickup 14 may be restrained from moving to the inner circumferential side from the innermost circumferential position Min during the ordinary information recording or reproducing operation. If the pickup 14 is moved to the inner circumferential side from the innermost circumferential side Min due to an abnormal condition such as when a large vibration from the outside is applied, the pickup 14 is mechanically regulated not to be moved to the inner circumferential side from the absolute regulation position EN.

Also, the position of the optical axis center of the objective lens 15 when the pickup 14 is moved to the outer circumferential side and comes into direct contact with the guide shaft support member 20 is defined at the outermost circumferential position Mout in the pickup movement range W, and this outermost circumferential position Mout is located slightly outside a program area PA of the optical disk DK to the outer circumferential side.

Further, a presettable counter (hereinafter referred to as an "internal counter") for counting the position of the pickup 14 as a counting value C is provided within the microprocessor for controlling this traverse mechanism, and in the normalization as will be described later, the pickup 14 is brought into direct contact with the guide shaft support member 20 to move the optical axis center of the objective lens 15 to the outermost circumferential position Mout, where the counting value C of the internal counter is preset at the maximum value CTout.

Also, if the pickup 14 is moved to the inner circumferential side by supplying a driving pulse to the stepping motor 24, the internal counter is counted down by the number proportional to the number of driving pulses with reference to the preset maximum value CTout, so that its counting value C indicates the current position of the pickup 14 in the pickup movement range W.

Also, if the pickup 14 is moved to the outer circumferential side by supplying a driving pulse to the stepping motor 24 in a state where the pickup 14 is placed at arbitrary position in the pickup movement range W, the internal counter is counted up by the number proportional to the number of driving pulses, so that its counting value C indicates the current position of the pickup 14 in the pickup movement range W.

Also, if the optical axis center of the objective lens 15 comes to a predetermined position near the outermost circumferential track (first track for storing the management information) in the lead-in area LA of the optical disk DK, the counting value C of the internal counter gets zero. If the optical axis center of the objective lens 15 comes to the innermost circumferential position Min, the counting value C of the internal counter gets a predetermined negative value −CTin.

In this way, the pickup movement range W is defined such that the counting value C of the internal counter satisfies the relation $-CTin \leq C \leq CTout$ with reference to the maximum value CTout preset.

After the counting value C of the internal counter is set at the maximum value CTout by bringing the optical pickup 1 into direct contact with the guide shaft support member 20, if the pickup 14 is moved to the inner circumferential side till the counting value C of the program counter gets zero by supplying a number of driving pulses proportional to the maximum value CTout to the stepping motor 24, the optical axis center of the objective lens 15 can be just located at a predetermined position near the outermost circumferential track in the lead-in area LA of the optical disk DK.

By the way, in the normalization, the pickup 14 is forcefully brought into direct contact with the guide shaft support member 20 by supplying a number of driving pulses proportional to the number CTout+CTin+α that is larger than the value CTout+CTin corresponding to the pickup movement range W to the stepping motor 24, so that the optical axis center of the objective lens 15 is surely aligned at the outermost circumferential position Mout, and the counting value C of the internal counter is preset at the maximum value CTout.

In this way, if the pickup 14 is forcefully brought into direct contact with the guide shaft support member 20 by supplying a number of driving pulses proportional to the predetermined number CTout+CTin+α to the stepping motor 24, the pickup 14 is regulated by the guide shaft support member 20 from moving to the outer circumferential side, and stopped, while the lead screw 29 tries to be rotated under a driving force of the stepping motor 24, so that a phenomenon of "step out" occurs between the engaging projections 27, 28 and the tooth flank of the lead screw 29.

Namely, even if the pickup 14 comes into direct contact with the guide shaft support member 20 and is stopped, the engaging projections 27, 28 continues to receive the biasing forces Fb1, Fb2 from the left side tooth flank Ab of the lead screw 29, as shown in FIG. 4. Further, from the relation between the biasing direction of the biasing forces Fb1, Fb2 and the inclination direction Za of the engaging projections 27, 28, the engaging projections 27, 28 try to engage strongly with the trough of the lead screw 29.

This condition is called "step out", and if the "step out" occurs, the engaging projections 27, 28 and the lead screw 29 are stopped while engaging with each other, while the stepping motor 24 lies in an overloaded state during the period the driving pulse is supplied.

Since the engaging projections 27, 28 strongly engage with the tooth flank of the lead screw 29, there occurs no condition such as "out of tooth" where the engaging projection gets rid of the tooth flank of the lead screw 29. Accordingly, even if the "step out" occurs, no large imitation sound arises between the engaging projections 27, 28 and the tooth flank of the lead screw 29, whereby the operation of normalizing the pickup 14 to the outermost circumferential position Mout can be effected in a still state.

Also, since the "step out" arises at the outermost circumferential position Mout that is at the deepest position with respect to the loading/unloading opening, the user may not be discomforted if there occurs any frictional sound between the engaging projections 27, 28 and the tooth flank of the lead screw 29, because the frictional sound is not so large. Also, the frictional sound that occurs away from the loading/unloading opening will not leak outside, and the silence can be kept.

In this connection, when the pickup 14 is moved to the absolute regulation position EN due to any abnormal condition, the engaging projections 27, 28 continue to receive the biasing forces Fa1, Fa2 from the right tooth flank Aa of the lead screw 29, if the stepping motor 24 tries to rotate the lead screw 29 in a counterclockwise direction θrt, as shown in FIG. 4. Further, from the relation between the biasing direction of the biasing forces Fa1, Fa2 and the inclination direction Za of the engaging projections 27, 28, the engaging projections 27, 28 ride over the crest of the lead screw 29 to cause an "out of tooth".

However, in this embodiment, the pickup movement range W is set up with the reference to the outermost circumferential position Mout, and the number of driving pulses to the stepping motor 24 is controlled so that the counting value C of the internal counter may not be smaller than the predetermined negative value −CTin, whereby the occurrence of "out of tooth" can be suppressed almost securely.

The typical operation of the information recording/reproducing apparatus to read the information will be set forth below with reference to the flowcharts of FIGS. 6 and 7 and an operation diagram of FIGS. 8A and 8B.

Figure 6:
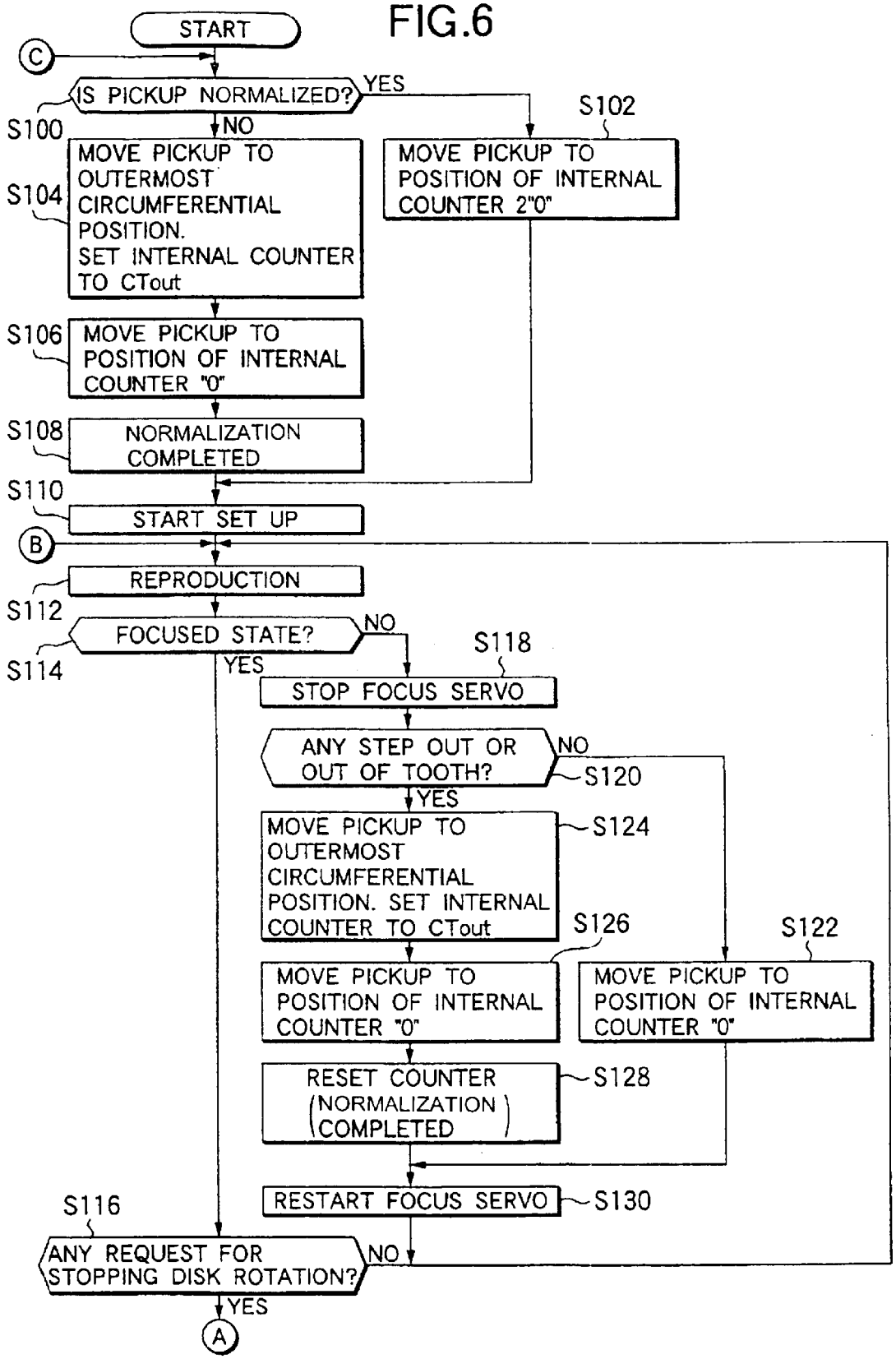
FIG. 6 is a flowchart showing a typical operation example of the information recording/reproducing apparatus.

First of all, if the power of this information recording/reproducing apparatus is turned on, the microprocessor judges, on the basis of the flag data, whether or not the pickup 14 has been already normalized, in FIG. 6. If normalized, the procedure transfers to step S102, or otherwise to step S104.

That is, if the position of the pickup 14 has been already normalized, the counting value of the internal counter correctly corresponds to the position of the pickup 14. Therefore, the stepping motor 24 is rotated till the counting value of the internal counter get "0" at step S102. Thereby, the pickup 14 is moved to the position at the outermost circumferential track in the lead-in area LA, as shown in FIG. 8B.

On one hand, if the position of the pickup 14 is not normalized, at step S104, the stepping motor 24 is rotated in a clockwise direction θt by supplying a number of driving pulses corresponding to the predetermined number CTout+CTin+α. Thereby, the pickup 14 is forcefully moved to the outermost circumferential position Mout and further the counting value of the internal counter is preset at the maximum value CTout, as shown in FIG. 8A.

Figure 8A:
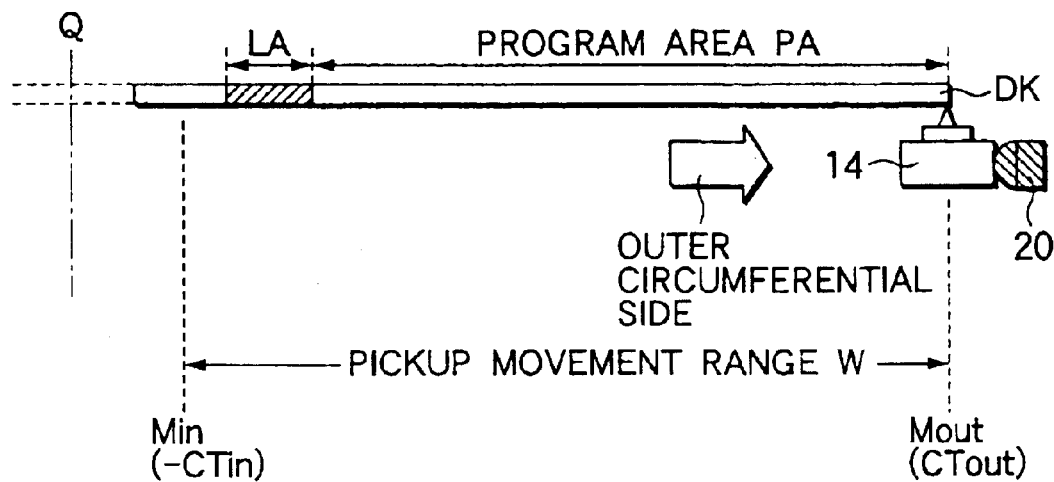
FIGS. 8A and 8B are views for explaining a normalization operation.
Figure 8B:
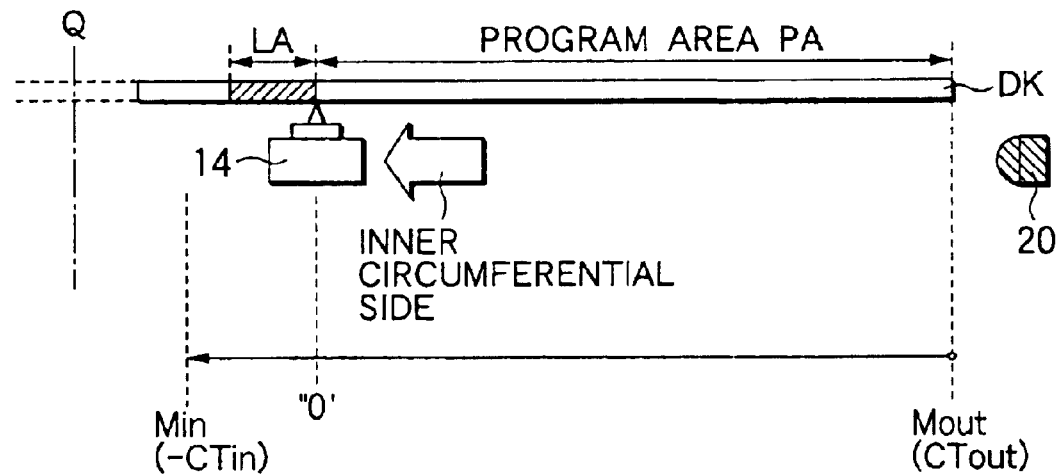

After the processing at step S104 is completed, the stepping motor 24 is rotated in the counterclockwise direction θrt till the counting value of the internal counter gets "0" at step S106, so that the pickup 14 is moved to a predetermined position near the outermost circumferential track in the lead-in area LA, as shown in FIG. 8B. Then, "1" is set in a data flag at step S108, thereby making sure that the normalization process at steps S104, S106 is completed. The judgement of normalization at step S100 is made by checking the data flag that is set to "1" in the previous normalization process.

At step S110, the classification is discriminated by the pickup 14 reading the information of the optical disk DK, and the set up is effected by reproducing the management information recorded in the lead-in area LA.

After the set up is ended, the pickup 14 starts to read and reproduce the information recorded in the program area PA of the optical disk DK at step S112. While reading, the signal processing circuit checks whether or not the pickup 14 is in focused state on the basis of the information read by the pickup 14 at step S114.

Herein, if in the focused state, the procedure transfers to step S116 while continuing the reproducing operation, where it is judged whether or not the user makes an instruction for stopping the rotation of the optical disk DK (or an instruction for stopping the reproduction). If no instruction for stopping the reproduction is issued, the procedure returns to step S112 to continue the information reading operation.

If it is judged that the pickup 14 is out of focus, the procedure goes to step S118 to stop a focus servo temporarily at step S114. Then, at step S120, it is checked whether or not there occurs a "step out" or "out of tooth". If there is no "step out" or "out of tooth", the procedure goes to step S122 to make the same processing of step S102, and to step S130 to resume the focus servo. Then the procedure transfers to the reproduction processing at step S112.

If it is judged that there is the "step out" or "out of tooth" at step S120, the same normalization process of steps S104 to S108 is performed at steps S124 to S128, because the relation between the counting value of the internal counter and the position of the pickup 14 is out of order. If the normalization is completed, the focus servo is resumed at step S130. Then the procedure returns to the reproduction processing at step S112.

Figure 7:
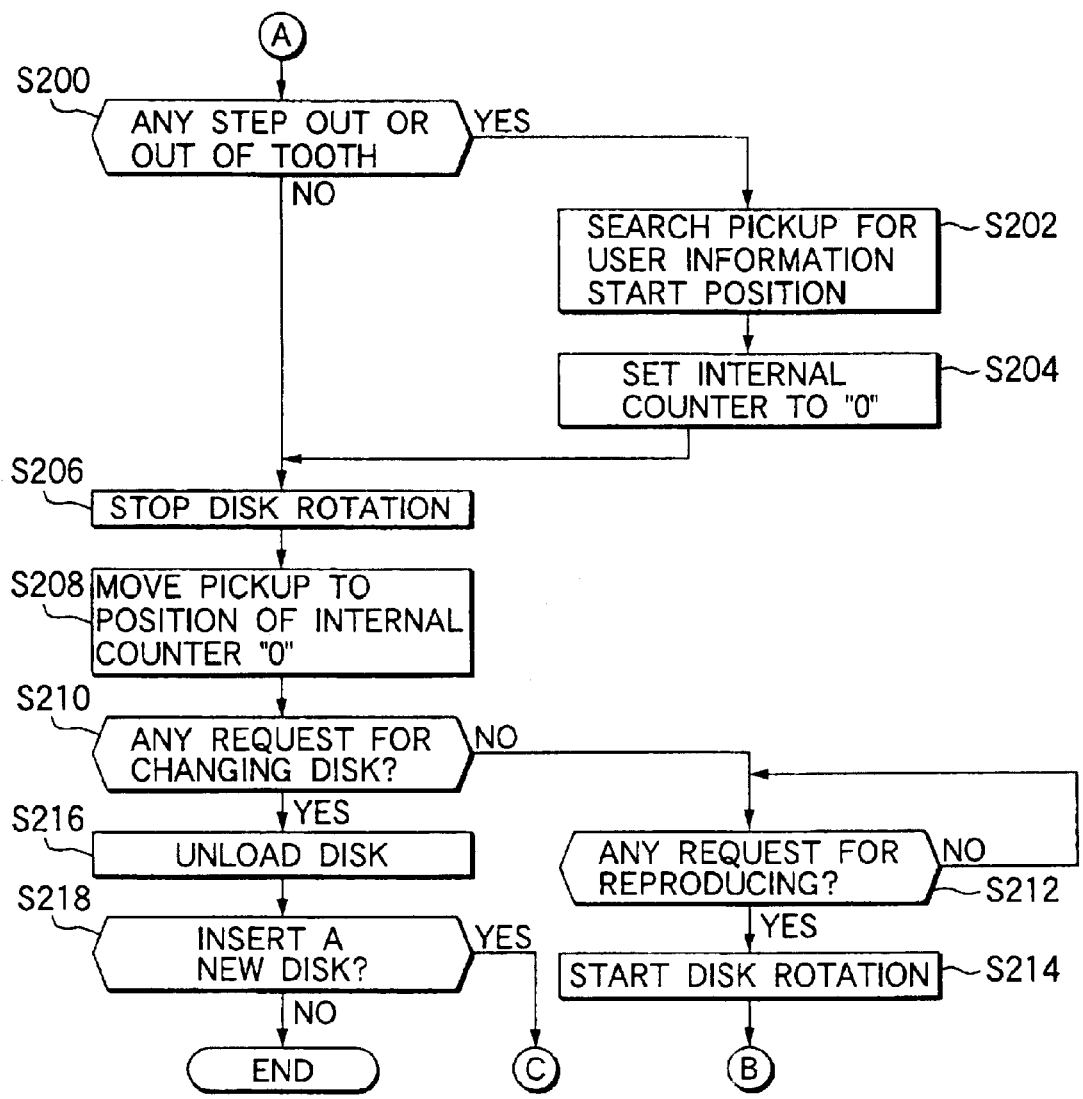
FIG. 7 is a flowchart further showing a typical operation example of the information recording/reproducing apparatus, continued from the flowchart of FIG. 6.

Then, if there is an instruction for stopping the reproduction at step S116, the procedure transfers to step S200 as shown in FIG. 7, where it is judged whether or not the "step out" or "out of tooth" arises. Herein, if the "step out" or "out of tooth" arises, the user information start position or near the innermost circumferential position in the program area PA is searched at step S202, and the counting value of the internal counter is set to "0" at step S204. Thereby, the normalization of the pickup 14 is completed, and the procedure transfers to the processings following step S206.

On the other hand, if there is no "step out" or "out of tooth" at step S200, the rotation of the optical disk DK with the hub portion 16 is stopped at step S206. Then, the pickup 14 is moved to the position at which the counting value of the internal counter gets "0" at step S208.

At step S210, it is judged whether or not the user has issued an instruction for changing to another optical disk. If there is no instruction, the procedure transfers to step S212 to wait for an instruction for starting the reproduction. If the instruction for starting the reproduction is issued, the rotation of the optical disk DK with the hub portion 16 is started at step S214. Then the procedure returns to the processing at step S112 in FIG. 6 to continue to read the information from the optical disk DK.

If the user has made an instruction for changing to another optical disk at step S210, the optical disk DK clamped in the hub portion 16 is unloaded through the loading/unloading opening outside at step S216. Then if it is judged that a new optical disk is inserted at step S218, the procedure is started again from step S100 as shown in FIG. 6.

In this way, with the information recording/reproducing apparatus, the pickup 14 is forcefully moved to the outermost circumferential position Mout to normalize the position of the pickup 14, in which step out is caused between the engaging projections 27, 28 and the lead screw 29. Therefore, the normalization process can be made silently. Namely, in the "step out", the engaging projections 27, 28 only engage strongly with the tooth flank of the lead screw 29, but do not get rid of the tooth flank as in the "out of tooth", whereby there is the effect that the normalization process can be made in silence.

Also, since the "step out" only arises at the outermost circumferential position Mout that is the deepest position from the loading/unloading opening, even though a frictional sound or an imitation sound occurs, the user may not be discomforted because no large sound will leak outside, so that the silence is kept.

Figure 10:
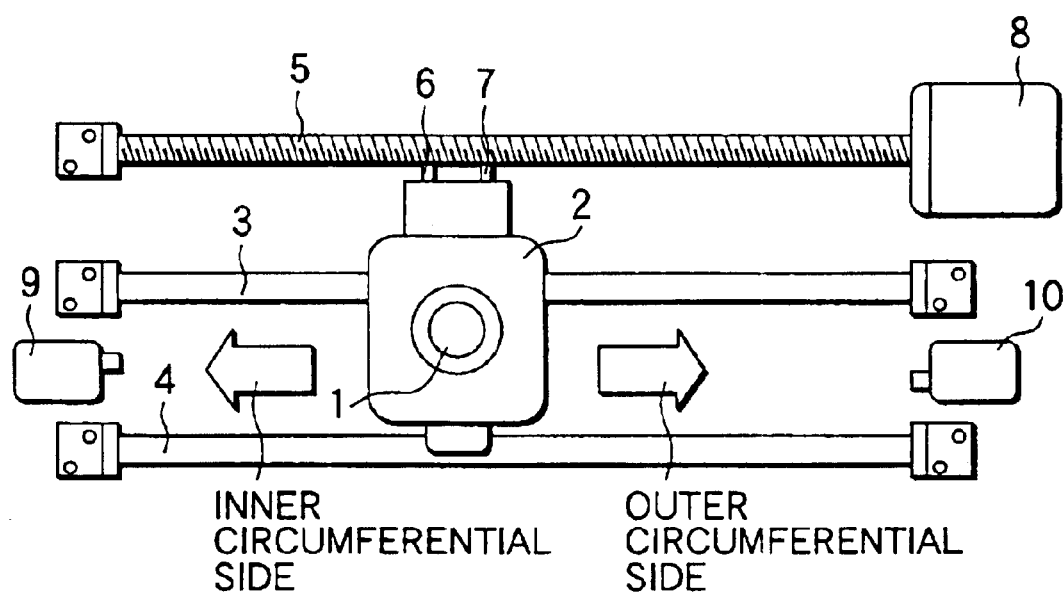
FIG. 10 is a view showing the constitution of the conventional information recording/reproducing apparatus.

Because the position of the pickup 14 can be normalized without providing the detection switch such as a micro switch, unlike the conventional information recording/reproducing apparatus of FIG. 10, the number of parts can be reduced.

Owing to the use of the stepping motor 24 as driving means, the pickup 14 can be moved correctly in accordance with the counting value of the internal counter, after the normalization.

In this embodiment as described above, the shape of the tooth flank of the lead screw 29 is designed such that the "step out" is caused in the outer circumferential side of the optical disk DK, and the "out of tooth" arises on the inner circumferential side of the optical disk DK, the "step out" is only utilized in the normalization or ordinary operation, without producing uncomfortable sound due to "out of tooth".

However, this invention is not limited to the above embodiment. As a variation, the tooth flank of the lead screw 29 and the shape of the engaging projections 27, 28 maybe designed such that the "step out" may be caused on the inner circumferential side of the optical disk DK, and the "out of tooth" may be caused on the outer circumferential side of the optical disk DK. Namely, the crest and the trough of the lead screw 29 are formed like an opposite helix to one shown in FIG. 4, and the engaging projections 27, 28 are inclinedly provided to engage with the trough inclined by the opposite helix.

Figure 9A:
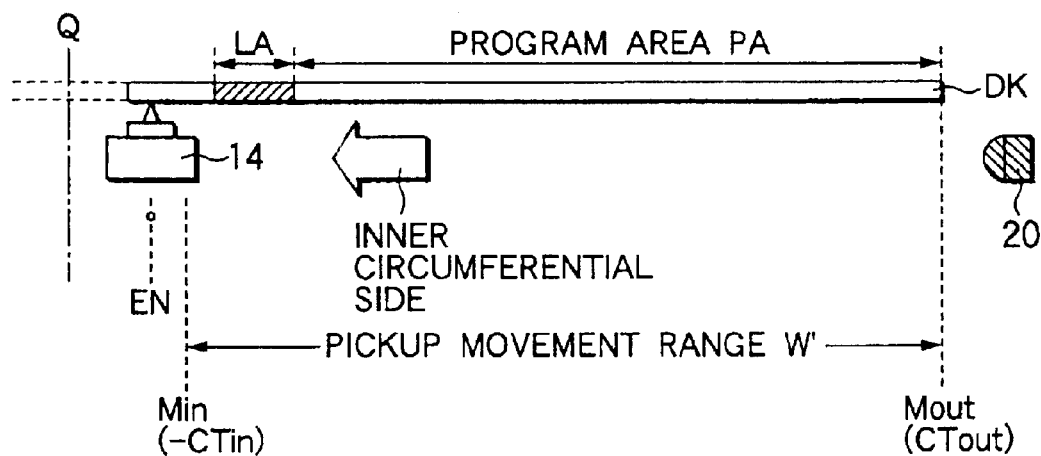
FIGS. 9A and 9B are views for explaining a variation.

With such a constitution, as shown in FIG. 9A, the pickup 14 is forcefully moved to the absolute regulation position EN by supplying a number of driving pulses proportional to the number CTout+CTin+α that is larger than the value CTout+CTin corresponding to the pickup movement range W' to the stepping motor 24, and the counting value of the internal counter is preset to a predetermined negative value −(CTin+β) corresponding to the absolute regulation position EN, so that the normalization is made.

Figure 9B:
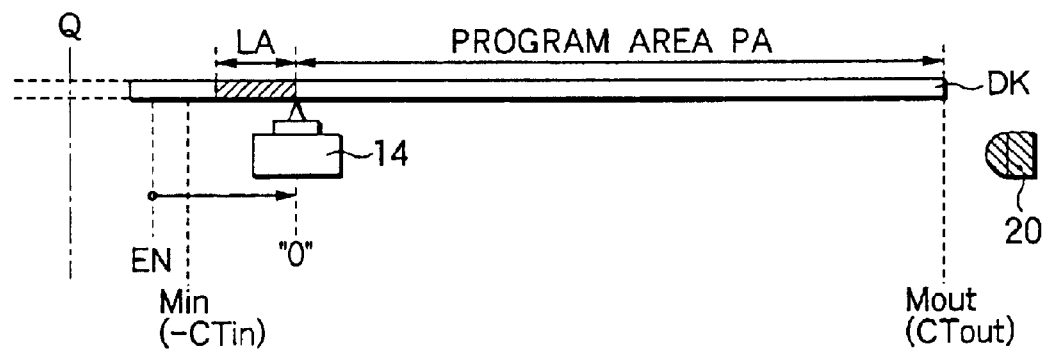

That is, the "step out" is caused by moving forcefully the pickup 14 to the absolute regulation position EN. And the pickup 14 is moved to the outer circumferential side, till the counting value of the internal counter gets "0", as shown in FIG. 9B. Thereby the pickup 14 is moved to a predetermined position near the outermost circumferential position in the lead-in area LA or near the innermost circumferential position in the program area PA to make the set up.

After the normalization is ended, the counting value C of the internal counter is controlled to be no smaller than the negative value −CTin corresponding to the innermost circumferential position Min, and to be no larger than the maximum value CTout corresponding to the outermost circumferential position Mout. Namely, the pickup 14 is moved in the pickup movement range W' by controlling the counting value C within the range −CTin≦C≦CTout.

With such a variant constitution, since the position near the outermost circumferential position in the lead-in area LA where the classification information of the optical disk is recorded or the innermost circumferential position in the program area PA is close to the inner circumferential side of the optical disk, the classification information can be read promptly to transfer to the set up process, when the pickup 14 is forcefully moved to the absolute regulation position EN to make the normalization, rather than when the pickup 14 is forcefully moved to the outer most circumferential position Mout to make the normalization. Also, the occurrence of sound such as "out of tooth" can be suppressed, even if the "step out" of the pickup 14 is caused at the absolute regulation position EN. Therefore, the normalization process can be made silently.

As described above, with the present invention, the pickup is brought into direct contact with the regulation means to normalize the position of the pickup 14, whereby there is no need for providing the detection switch for detecting the position as required in the conventional art, so that the number of parts is reduced.

In the normalization, the step out between the engaging members and the lead screw is caused, whereby the silent information recording/reproducing apparatus can be provided.

Also, regulation means is provided on the side close to the management information recording area of the information recording/reproducing medium, and the pickup is brought into direct contact with the regulation means, whereby the contact position is defined as the reference position of the pickup. Therefore, the position of the pickup can be normalized promptly, and the pickup can gain rapid access to the management information recording area.

What is claimed is:

1. An information recording/reproducing apparatus for reading or writing the information by moving a pickup within a predetermined movement range over an information recording/reproducing medium, said apparatus comprising:

a lead screw extending in a predetermined direction with respect to said information recording/reproducing medium;

a driver that drives said lead screw in rotation;

a support unit that supports said pickup movably along an extending direction of said lead screw;

engaging members for engaging with a tooth flank of said lead screw and integrated with said pickup;

a regulator that regulates a movable range of said pickup; and a controller that controls said driver to drive said lead screw in rotation to bring said pickup into direct contact with said regulator to normalize a reference position of said pickup in the movable range;

wherein the tooth flank of said lead screw engaged by said engaging members is formed in a shape that a biasing force acts on the engaging members to engage with a trough of said lead screw when said pickup comes into direct contact with said regulator.

2. The information recording/reproducing apparatus according to claim 1, wherein said regulator is provided at a position off a loading position of said information recording/reproducing medium.

3. The information recording/reproducing apparatus according to claim 1, wherein said controller controls said driver to rotate said lead screw to bring said pickup into direct contact with said regulator, and then said driver to rotate said lead screw by a predetermined amount to move said pickup to a position off said regulator and to normalize the position after movement as the reference position of said pickup.

4. The information recording/reproducing apparatus according to claim 1, wherein said regulator is provided near the loading position of said information recording/reproducing medium.

5. The information recording/reproducing apparatus according to claim 4, wherein said controller controls said driver to drive said lead screw in rotation to bring said pickup into direct contact with said regulator at a position near the loading position of said information recording/reproducing medium to normalize the reference position of said pickup in the movable range.

6. The information recording/reproducing apparatus according to claim 5, wherein said driver comprises a stepping motor for setting up the amount of rotation in accordance with the driving pulses supplied.

* * * * *